A. B. LATTA.
Carriage-Wheel.
No. 15,297.  Patented July 8, 1856.
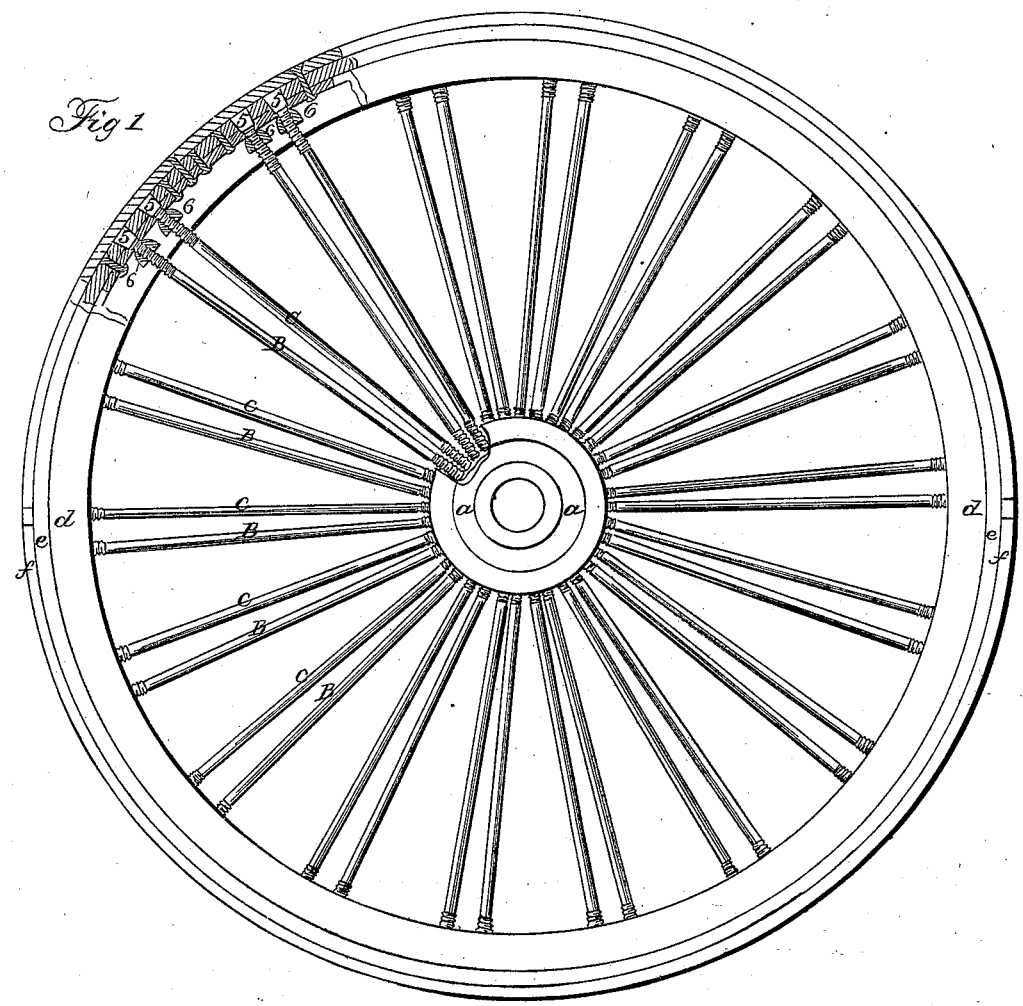
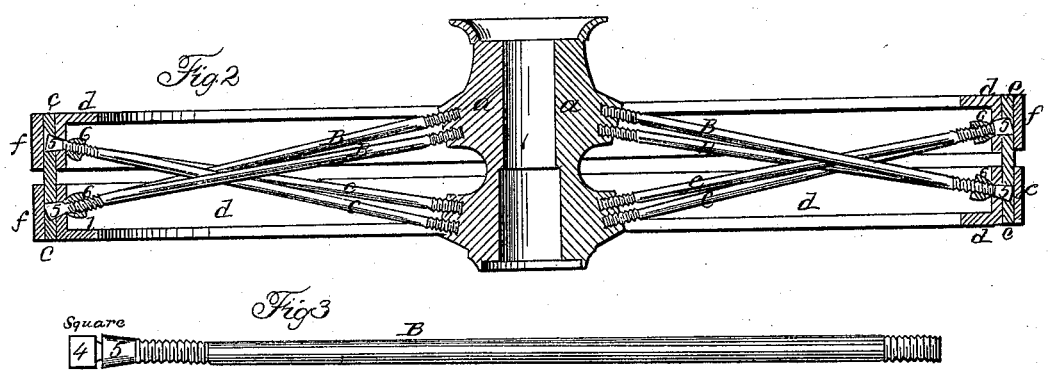

UNITED STATES PATENT OFFICE.

ALEXANDER B. LATTA, OF CINCINNATI, OHIO.

IMPROVED WHEEL FOR STEAM-CARRIAGES.

Specification forming part of Letters Patent No. 15,297, dated July 8, 1856.

*To all whom it may concern:*

Be it known that I, ALEXANDER B. LATTA, of Cincinnati, in the county of Hamilton and State of Ohio, have invented a new and useful Improvement which I denominate a Combination Carriage-Wheel, which is described as follows, reference being had to the annexed drawings of the same and making part of this specification.

Figure 1 is a side elevation of the wheel with part of the rim broken off to show the interior. A part of the hub is broken off also to show the distance the spokes are screwed in. $a$ is the hub of the wheel. B C B C B C B C are the spokes. $d$ is the angle-iron, which is in the place of the fellies in common wheels. The shape and nature of this rim will be explained in Fig. 2. $e$ is the rim-tire on rim of the wheel. This rim is welded up like a hoop before the angle-iron is riveted into it. It will be seen that these spokes pass through the rim and angle-iron from the outside and screw into the hub, having a conical head on the outer end, the spoke in the rim and angle-iron being countersunk to fit the taper. Inside of the angle-iron is a square sink cut square with the spoke, in order to let the jam-nuts 5 6 5 6 must be run up tight against the angle-iron. It must be borne in mind the spokes should be screwed in tight in the first place all around until the wheel is solid. Then the jam-nuts 5 6 5 6 must be run up tight against the rim. This is to get the strength of the spoke as a brace, first having the strength of the iron in the way of drawing it tight from the outside, by which all the tenacity of the iron is obtained. The spaces between spokes in the rim are riveted first to the angle-iron, and then the rivets that hold the wearing-tire on are passed through the rim and angle-iron. The wearing-tire F is cut apart in places in order to allow this tire to stretch as it runs over hard pavements. The rivets still hold it fast, notwithstanding it stretches to considerable extent.

Fig. 2 is a section of Fig. 1 cut through the center of the hub horizontally, in order to show the shape of hub, angle-iron, &c. B C B C are the spokes; $a\ a$, the hub; $d\ d$, the angle-iron; $e\ e$, the rim of wheel; $f\ f$, the wearing-tire, which will be seen in two parts having a space between them. This is for the purpose of preventing sliding on bowldered pavements. Where wheels have heavy loads to haul, it is necessary that they be made with wide treads. This wheel is peculiarly calculated for bearing heavy burdens, when common wheels in carrying heavy loads stretch the tire, and then the spokes are worked, because they are not bound tight together. In this wheel, it will be seen, the rim is built independent of the tire that is exposed to the wear. In this respect it is superior to any wheel made in the common way. The spokes never need screwing up after being set in the first place.

Fig. 3 represents a spoke. It is necessary in making these wheels to forge a square on the outer end of Fig. 4. This is done in order to enable workmen to screw them in tight. It serves to put the wrench on. It has a niche turned under the square. This is to make the square cut off easy. The spoke is screwed on tight.

I am aware many attempts have been made to make wheels of wrought-iron in different ways. Wrought-iron is the best material for this wheel throughout. Failures from various causes occurred in constructing carriage-wheels.

To cross the spokes is not anything new, nor is it new to draw the spokes from the outside. That has been done before; but the crossed spoke with the jammed nut, combined with the angle-iron and sectional tire, is a new combination. This wheel has now been in use one year under a steam fire-engine weighing six tons and has proved itself sufficient to stand without any repairs. Wheels made of wood would not stand any length of time.

I am aware that the different parts composing the wheel have been separately used before, which I disclaim when taken separately; but What I do claim as my improvement, and desire to secure by Letters Patent, is—

The combination of the tire $e$, angle-tire $d$, sectional tire $f$, cross-spokes B and C, and jam-nuts 6, for purposes mentioned in the foregoing specification.

A. B. LATTA.

Witnesses:
W. CHIDSEY,
JOS. SERODINO.